US012694005B2

(12) United States Patent
Schlicher et al.

(10) Patent No.: US 12,694,005 B2
(45) Date of Patent: Jul. 28, 2026

(54) METHOD, SYSTEM AND COMPUTER PROGRAM PRODUCT FOR REGISTERING DIGITAL ASSETS FOR LIFECYCLE EVENTS, NOTARIZATIONS, AND RESPONSES

(71) Applicant: AVC Innovations LLC, Spearfish, SD (US)

(72) Inventors: Bob G. Schlicher, Knoxville, TN (US); David J. Todd, Spearfish, SD (US); Niels C. Skjoldager, Seminole, FL (US); Shaikha Dheya Ebrahim Al Khalifa, Manama (BH)

(73) Assignee: AVC Innovations, LLC., Spearfish, SD (US)

( * ) Notice: Subject to any disclaimer, the term of this patent is extended or adjusted under 35 U.S.C. 154(b) by 0 days.

(21) Appl. No.: 18/600,595

(22) Filed: Mar. 8, 2024

(65) Prior Publication Data

US 2025/0021534 A1     Jan. 16, 2025

Related U.S. Application Data

(60) Provisional application No. 63/526,905, filed on Jul. 14, 2023.

(51) Int. Cl.
*G06F 7/00*      (2006.01)
*G06F 16/21*     (2019.01)
*G06F 16/27*     (2019.01)
(52) U.S. Cl.
CPC ............ *G06F 16/219* (2019.01); *G06F 16/27* (2019.01)

(58) Field of Classification Search
CPC ............................... G06F 16/219; G06F 16/27
See application file for complete search history.

(56) References Cited

U.S. PATENT DOCUMENTS 7,716,619 B2    5/2010  Braceras et al.
9,855,785 B1    1/2018  Nagelberg et al.
(Continued)

OTHER PUBLICATIONS

ISR & WO from PCT/US 24/ 19448 with four references.

*Primary Examiner* — Mohammed R Uddin
(74) *Attorney, Agent, or Firm* — Reston Law Group, LLP; Ralph P. Albrecht; Jesse A. Fenty

(57)     ABSTRACT

A computer-implemented method of registering digital assets (DA) for lifecycle events, notarizations, responses, including: receiving data for the DA (parties identification (PA), asset type metadata); receiving transaction to create DA with data; obtaining asset type template (ATT) determining availability, if available: generating DA record (DAR) and contents from ATT; obtaining notary recipe (NR) template (NRT) for contents; determining if the NRT available and if not creating an NR; or generating/assigning NR to data of DAR; and if available, proceeding, to creating DAR, data specification and assigning to DAR; or obtaining/ creating/assigning, NRT for data specification; and assigning PA for digital signatures and double notary criteria to NR; granting signature authority (SA) for DAR to system asset proxy account (SAPA); assigning the SA to DAR; storing DAR; assembling, assigning DA nonfungible token (NFT) data record (DR), to NFT blockchain; verifying SAPA for SA for DA; creating event transaction for SA/SAPA, and assigning event transaction to separate blockchain.

20 Claims, 4 Drawing Sheets

200

(56) References Cited

U.S. PATENT DOCUMENTS

| | | | |
|---|---|---|---|
| 10,505,726 B1 | 12/2019 | Andon et al. | |
| 10,540,654 B1 | 1/2020 | James et al. | |
| 10,614,661 B2 | 4/2020 | Doney et al. | |
| 10,789,239 B2 | 9/2020 | Ventura et al. | |
| 10,951,409 B2 | 3/2021 | Konda et al. | |
| 10,972,274 B2 | 4/2021 | Redpath et al. | |
| 10,991,185 B1 | 4/2021 | Luthra et al. | |
| 11,038,718 B2 | 6/2021 | Simons | |
| 11,048,788 B2 | 6/2021 | Witchey et al. | |
| 11,070,564 B2 | 7/2021 | McIver et al. | |
| 11,138,580 B1 | 10/2021 | Koch | |
| 11,170,092 B1 | 11/2021 | Liang | |
| 11,171,782 B2 | 11/2021 | Tang et al. | |
| 11,200,569 B1 | 12/2021 | James et al. | |
| 11,575,676 B1* | 2/2023 | Banks | G06T 11/00 |
| 11,954,215 B1* | 4/2024 | Lebowitz | G06F 21/64 |
| 2004/0221162 A1 | 11/2004 | Kongtcheu | |
| 2009/0077386 A1 | 3/2009 | Simonian | |
| 2016/0283920 A1 | 9/2016 | Fisher et al. | |
| 2017/0046664 A1 | 2/2017 | Haldenby et al. | |
| 2019/0130416 A1 | 5/2019 | Boudville et al. | |
| 2019/0279197 A1 | 9/2019 | Wright et al. | |
| 2020/0280444 A1 | 9/2020 | Tang et al. | |
| 2020/0294128 A1 | 9/2020 | Howard | |
| 2021/0248338 A1* | 8/2021 | Spivack | G06K 7/10831 |
| 2021/0256070 A1* | 8/2021 | Tran | G06Q 20/18 |
| 2021/0297258 A1* | 9/2021 | Keith, Jr. | H04L 9/0866 |
| 2022/0058633 A1 | 2/2022 | Yantis et al. | |
| 2022/0188810 A1* | 6/2022 | Doney | G06Q 20/401 |
| 2022/0198562 A1* | 6/2022 | Cella | G06Q 40/04 |
| 2022/0210061 A1* | 6/2022 | Simu | H04L 9/3239 |
| 2022/0229883 A1* | 7/2022 | Khandelwal | G06Q 30/0185 |
| 2022/0253868 A1 | 8/2022 | Scarseli | |
| 2022/0270725 A1* | 8/2022 | Derosa-Grund | G06F 16/2365 |
| 2022/0366061 A1* | 11/2022 | Spivack | H04L 9/3271 |
| 2023/0086191 A1* | 3/2023 | Jakobsson | H04L 9/3231 |
| | | | 705/66 |
| 2023/0130182 A1* | 4/2023 | Mir | H04L 9/3297 |
| | | | 713/189 |
| 2023/0177490 A1* | 6/2023 | Moore | G06Q 20/3827 |
| | | | 705/66 |
| 2023/0237349 A1* | 7/2023 | Donoho | G06Q 50/18 |
| | | | 706/46 |
| 2023/0252809 A1* | 8/2023 | Fadzeyeu | G06V 30/41 |
| | | | 382/103 |
| 2023/0281606 A1* | 9/2023 | Jakobsson | G06Q 20/3674 |
| | | | 705/67 |
| 2023/0325814 A1* | 10/2023 | Vijayan | G06Q 20/3829 |
| | | | 705/66 |
| 2024/0086384 A1* | 3/2024 | Soon-Shiong | G06F 16/2255 |
| 2024/0104950 A1* | 3/2024 | Porter | G06V 30/412 |
| 2024/0261692 A1* | 8/2024 | Sliwka | H04L 9/3213 |
| 2025/0019480 A1* | 1/2025 | Biso | C08F 220/56 |
| 2025/0021534 A1* | 1/2025 | Schlicher | G06F 16/27 |
| 2025/0023742 A1* | 1/2025 | Schlicher | H04L 9/50 |

\* cited by examiner

200

METHOD, SYSTEM AND COMPUTER PROGRAM PRODUCT FOR REGISTERING DIGITAL ASSETS FOR LIFECYCLE EVENTS, NOTARIZATIONS, AND RESPONSES

BACKGROUND OF THE DISCLOSURE

Field of the Disclosure

This present disclosure relates generally to blockchains, and more particularly to non-fungible tokens.

SUMMARY OF THE INVENTION

According to one example embodiment, an example method, system or computer program product for registering digital assets for lifecycle events, notarizations, and responses that overcomes the disadvantages of conventional methods of this general type and of the prior art is set forth, according to one example embodiment.

According to one example embodiment, an example system, method, or computer program product may be provided, where an computer implemented method of registering digital assets for lifecycle events, notarizations, and responses, may include at least one electronic computer processor coupled to at least one electronic memory storage device and coupled via at least one communications interface to at least one data communications network, the method may include: electronically receiving or assembling, by the at least one electronic computer processor of an asset server system, data for at least one digital asset may include: parties identification data, asset type, and metadata; electronically receiving, by the at least one electronic computer processor, a transaction create digital asset with data request; electronically obtaining, by the at least one electronic computer processor, at least one asset type template; electronically determining, by the at least one electronic computer processor, availability of the at least one asset type template, and if the availability of the at least one asset type template is determined available, then proceeding, by the at least one electronic computer processor, to at least one or more of: electronically generating, by the at least one electronic computer processor, at least one digital asset record (DAR) and contents from the at least one asset type template; electronically obtaining, by the at least one electronic computer processor, at least one notary recipe template for digital asset contents; electronically determining, by the at least one electronic computer processor, if the at least one notary recipe template is available and only if not available creating, by the at least one electronic computer processor, a notary recipe; or electronically generating, by the at least one electronic computer processor, at least one notary recipe and assigning, by the at least one electronic computer processor, the at least one notary recipe to data or document of the at least one digital asset record (DAR); and if the availability of the at least one asset type template is determined not to be available, then proceeding, by the at least one electronic computer processor, to at least one or more of: electronically creating, by the at least one electronic computer processor, the at least one digital asset record (DAR); electronically creating, by the at least one electronic computer processor, the data or document specification and assigning, by the at least one electronic computer processor, the specification to the at least one digital asset record (DAR); or electronically obtaining, creating, or assigning, by the at least one electronic computer processor, the at least one notary recipe template for the data or document specification; and electronically assigning, by the at least one electronic computer processor, party identifiers to the at least one notary recipes for digital signatures; electronically assigning, by the at least one electronic computer processor, double notary criteria to the at least one notary recipe; electronically granting, by the at least one electronic computer processor, signature authority (SA) for the at least one digital asset record (DAR) to a system asset proxy account; electronically assigning, by the at least one electronic computer processor, the signature authority (SA) to the at least one digital asset record (DAR); electronically storing, by the at least one electronic computer processor, the at least one digital asset record (DAR) to at least one asset record data storage device; electronically assembling, by the at least one electronic computer processor, at least one digital asset nonfungible token (NFT) data record, and assigning, by the at least one electronic computer processor, the at least one digital asset nonfungible token (NFT) data record to at least one NFT blockchain; electronically verifying, by the at least one electronic computer processor, at least one system asset proxy account for the signature authority (SA) for the at least one digital asset; and electronically creating, by the at least one electronic computer processor, at least one event transaction for the signature authority (SA) and the at least one system asset proxy account, and electronically assigning, by the at least one electronic computer processor, the at least one event transaction to an at least one blockchain, separate from the at least one NFT blockchain, according to one example embodiment.

According to another example embodiment an example system of registering digital assets for lifecycle events, notarizations, and responses, may include: at least one electronic computer processor of at least one asset server, coupled to at least one electronic memory storage device and coupled via at least one communications interface, coupled to at least one data communications network, the system may include where the at least one electronic computer processor is configured to: electronically receive or assemble, data for at least one digital asset which may include: parties identification data, asset type, and metadata; electronically receive a transaction create digital asset with data request; electronically obtain at least one asset type template; electronically determine availability of the at least one asset type template, and if the availability of the at least one asset type template is determined available, then proceeding, by the at least one electronic computer processor, to at least one or more of: electronically generate at least one digital asset record (DAR) and contents from the at least one asset type template; electronically obtain at least one notary recipe template for digital asset contents; electronically determine if the at least one notary recipe template is available and only if not available create at least one notary recipe; or electronically generate the at least one notary recipe and assign the at least one notary recipe to data or document of the at least one digital asset record (DAR); and if the availability of the at least one asset type template is determined not to be available, then proceed to at least one or more of: electronically create the at least one digital asset record (DAR); electronically create the data or document specification and assigning, by the at least one electronic computer processor, the specification to the at least one digital asset record (DAR); or electronically obtain, create, or assign, the at least one notary recipe template for the data or document specification; and electronically assign party identifiers to the at least one notary recipes for digital signatures; electronically assign double notary criteria to the at least one notary recipe; electronically grant signature authority (SA) for the at least one digital asset record (DAR) to a system asset proxy account; electronically assign the signature authority (SA) to the at least one digital asset record (DAR); electronically store the at least one digital asset record (DAR) to at least one asset record data storage device; electronically assemble at least one digital asset nonfungible token (NFT) data record, and assign the at least one digital asset nonfungible token (NFT) data record to at least one blockchain; electronically verify at least one system asset proxy account for the signature authority (SA) for the at least one digital asset; and electronically create at least one event transaction for the signature authority (SA) and the at least one system asset proxy account, and electronically assign the at least one event transaction to an at least one blockchain, separate from the at least one NFT blockchain, according to one example embodiment.

According to yet another example embodiment an example computer program product embodied on a computer accessible nontransitory storage medium, including at least one instruction, which when executed on at least one electronic computer processor may perform a method of registering digital assets for lifecycle events, notarizations, and responses, the method may include, in one example embodiment: electronically receiving or assembling data for at least one digital asset may include: parties identification data, asset type, and metadata; electronically receiving a transaction create digital asset with data request; electronically obtaining at least one asset type template; electronically determining availability of the at least one asset type template, and if the availability of the at least one asset type template is determined available, then proceeding to at least one or more of: electronically generating at least one digital asset record (DAR) and contents from the at least one asset type template; electronically obtaining at least one notary recipe template for digital asset contents; electronically determining if the at least one notary recipe template is available and only if not available creating, by the at least one electronic computer processor, a notary recipe; or electronically generating at least one notary recipe and assigning the at least one notary recipe to data or document of the at least one digital asset record (DAR); and if the availability of the at least one asset type template is determined not to be available, then proceeding to at least one or more of: electronically creating the at least one digital asset record (DAR); electronically creating the data or document specification and assigning, by the at least one electronic computer processor, the specification to the at least one digital asset record (DAR); or electronically obtaining, creating, or assigning the at least one notary recipe template for the data or document specification; and electronically assigning party identifiers to the at least one notary recipes for digital signatures; electronically assigning double notary criteria to the at least one notary recipe; electronically granting signature authority (SA) for the at least one digital asset record (DAR) to a system asset proxy account; electronically assigning the signature authority (SA) to the at least one digital asset record (DAR); electronically storing the at least one digital asset record (DAR) to at least one asset record data storage device; electronically assembling at least one digital asset nonfungible token (NFT) data record, and assigning the at least one digital asset nonfungible token (NFT) data record to at least one NFT blockchain; electronically verifying at least one system asset proxy account for the signature authority (SA) for the at least one digital asset; and electronically creating at least one event transaction for the signature authority (SA) and the at least one system asset proxy account, and electronically assigning the at least one event transaction to an at least one blockchain, separate from the at least one NFT blockchain.

With the foregoing and other features and functions disclosed herein, in view there is provided, in accordance with various example embodiments of the claimed invention of the disclosure, a method that may involve a Digital Asset that may be implemented as a data record that may be expected to undergo events that may identify and describe changes to that record representing the Digital Asset over some duration of time, according to one example embodiment. A Digital Asset can represent a person, event, data, process, or subject, according to one example embodiment. The Digital Asset can be produced from a Digital Asset Type that may be encoded from a general data structure and behavior pattern of like or similar Digital Assets, according to one example embodiment. The Digital Asset Type may be analogous to a building blueprint that may be processed by the method to construct the data record to represent the Digital Asset, according to one example embodiment. The Digital Asset Type can contain templates for artifact descriptions and may identify notary assignments to those artifacts for such things as to validate the artifact's assignment to the Digital Asset, according to one example embodiment. A Digital Asset for this disclosure may include a dossier component with its contents as a collection of data and documents to add to the representation of the asset where the changes or events may be recorded through, e.g., but not limited to, a digital journal, case history method such as, e.g., but not limited to, a blockchain ledger and digital logging system, according to one example embodiment. The Digital Asset can be assigned arbitrary data types as an aggregate of digital artifacts such as, e.g., but not limited to, documents or paperwork, identities of involved parties with the asset, other related digital assets, dependencies on other assets, and so on, etc., according to one example embodiment. For a particular use case, documents may be collected and combined with data elements received from an Internet of Things (IoT) network where, e.g., but not limited to, both document and data element types may be assigned as the contents of the dossier, according to one example embodiment.

Although the invention is illustrated and described herein as embodied in an example embodiment of a method for registering digital assets for lifecycle events, notarizations, and responses, the invention should not be limited to the details shown in those embodiments because various modifications and structural changes may be made without departing from the spirit of the invention while remaining within the scope and range of equivalents of the claims, according to one example embodiment.

According to one example embodiment, the method may include where the digital asset is implemented as said at least one data asset record, and is expected to undergo events may include: identifying, and describing at least one change to said at least one data asset record representing said digital asset over a duration of time.

According to one example embodiment, the method may include where the digital asset may include: representing at least one or more of: a person, an event, data, a process, or a subject.

According to one example embodiment, the method may include where the digital asset may include: wherein said digital asset is produced from a digital asset type, and wherein said digital asset type is encoded from: a general data structure; and a behavior pattern of a similar digital asset to said digital asset.

According to one example embodiment, the method may include where the digital asset type is analogous to a building blueprint, wherein the building blueprint is processed by a method to construct a data record to represent the digital asset.

According to one example embodiment, the method may include where the digital asset type may include at least one template for artifact descriptions of an artifact, and may further include at least one or more of: identifying at least one notary assignment to the artifact; or validating the at least one notary assignment of the artifact to the Digital Asset.

According to one example embodiment, the method may include where the digital asset may include: a dossier component which may include: a collection of data and documents to add to the representation of the digital asset, wherein any change or any event is recorded through a digital journal, where the digital journal may include: a case history method which may include: a blockchain ledger, and a digital logging system.

According to one example embodiment, the method may include where the digital asset is assigned an arbitrary data type as an aggregate of digital artifacts which may include at least one or more of: documents, paperwork, identities of involved parties related to the digital asset, other related digital assets, or dependencies on other digital assets.

According to one example embodiment, the method may further include: collecting at least one document; and combining the at least one document with at least one data element received from an Internet of Things (IoT) network, where both the at least one document and an at least one data element type of said at least one data element are assigned as contents of a dossier.

According to one example embodiment, the system may include where the electronic computer processor is configured to at least one or more of: wherein said digital asset is implemented as said at least one data asset record, and is expected to undergo events comprising wherein said processor is configured to: identify, and describe at least one change to said at least one data asset record representing said digital asset over a duration of time; wherein said digital asset may include, wherein said processor is configured to: represent at least one or more of: a person, an event, data, a process, or a subject; wherein said digital asset may include: wherein the digital asset is produced from a digital asset type, and wherein said digital asset type is encoded from: a general data structure; and a behavior pattern of a similar digital asset to said digital asset; wherein the digital asset type is analogous to a building blueprint, wherein the building blueprint is configured to construct a data record to represent the digital asset; wherein the digital asset type may include at least one template for artifact descriptions of an artifact, and may further include where the processor is configured to at least one or more of: identify at least one notary assignment to the artifact; or validate the at least one notary assignment of the artifact to the Digital Asset; wherein said digital asset may include: a dossier component which may include: a collection of data and documents to add to the representation of the digital asset, wherein any change or any event is recorded through a digital journal, wherein said digital journal may include: a case history method which may include: a blockchain ledger, and a digital logging system; where the digital asset is assigned an arbitrary data type as an aggregate of digital artifacts which may include at least one or more of: documents, paperwork, identities of involved parties related to the digital asset, other related digital assets, or dependencies on other digital assets;

or which may further include: collecting at least one document; and combining the at least one document with at least one data element received from an Internet of Things (IoT) network, wherein both said at least one document and an at least one data element type of said at least one data element are assigned as contents of a dossier.

According to one example embodiment, the computer program product may include where the method may include, where the digital asset is implemented as the at least one data asset record, and is expected to undergo events may include: identifying, and describing at least one change to said at least one data asset record representing said digital asset over a duration of time.

According to one example embodiment, the computer program product may include where the method may include, where the method may include, where said digital asset may include: representing at least one or more of: a person, an event, data, a process, or a subject.

According to one example embodiment, the computer program product may include where the method may include, where the digital asset may include: wherein the digital asset is produced from a digital asset type, and where the digital asset type is encoded from: a general data structure; and a behavior pattern of a similar digital asset to said digital asset.

According to one example embodiment, the computer program product may include where the method may include, where the digital asset type is analogous to a building blueprint, wherein the building blueprint is processed by a method to construct a data record to represent the digital asset.

According to one example embodiment, the computer program product may include where the method may include, where the digital asset type comprises at least one template for artifact descriptions of an artifact, and further comprising at least one or more of: identifying at least one notary assignment to the artifact; or validating the at least one notary assignment of the artifact to the Digital Asset.

According to one example embodiment, the computer program product may include where the digital asset may include: a dossier component may include: a collection of data and documents to add to the representation of the digital asset, where any change or any event is recorded through a digital journal, wherein said digital journal may include: a case history method which may include: a blockchain ledger, and a digital logging system.

According to one example embodiment, the computer program product may include where the method may include, where the digital asset is assigned an arbitrary data type as an aggregate of digital artifacts comprising at least one or more of: documents, paperwork, identities of involved parties related to the digital asset, other related digital assets, or dependencies on other digital assets.

According to one example embodiment, the computer program product may include where the method may further include, the collecting at least one document; and combining the at least one document with at least one data element received from an Internet of Things (IoT) network, wherein both said at least one document and an at least one data element type of said at least one data element are assigned as contents of a dossier.

The construction and method of operation of the invention and additional features, functions, and example embodiments, and advantages of the invention may be best understood from the following description of specific example embodiments when read in connection with the accompanying drawings, according to various example embodiments.

BRIEF DESCRIPTION OF THE VARIOUS EXAMPLE VIEWS OF THE DRAWINGS

This present disclosure will be fully understood with reference to the following detailed description when taken in conjunction with the figures, herein:

Figure 3:
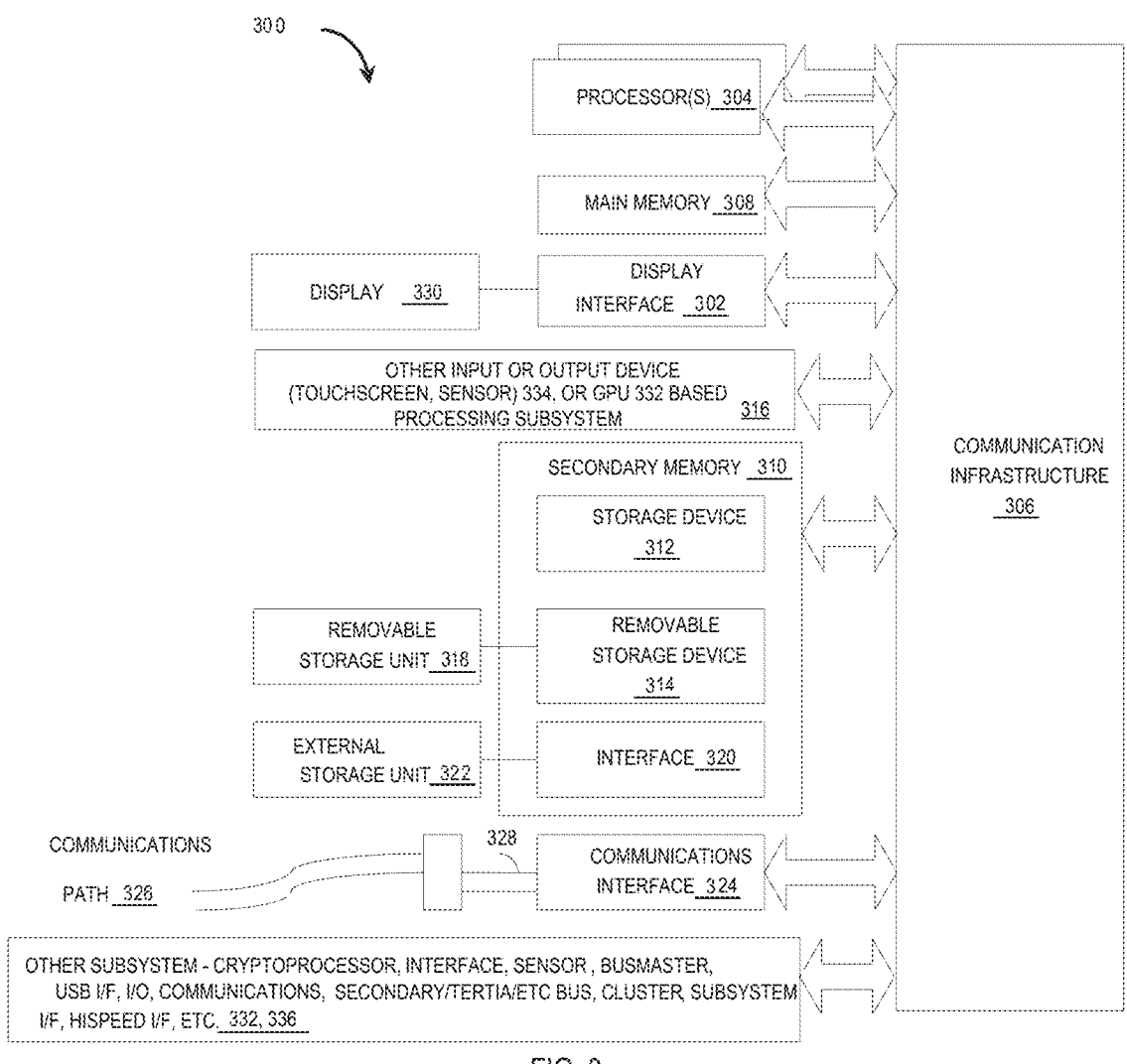
Figure 4:
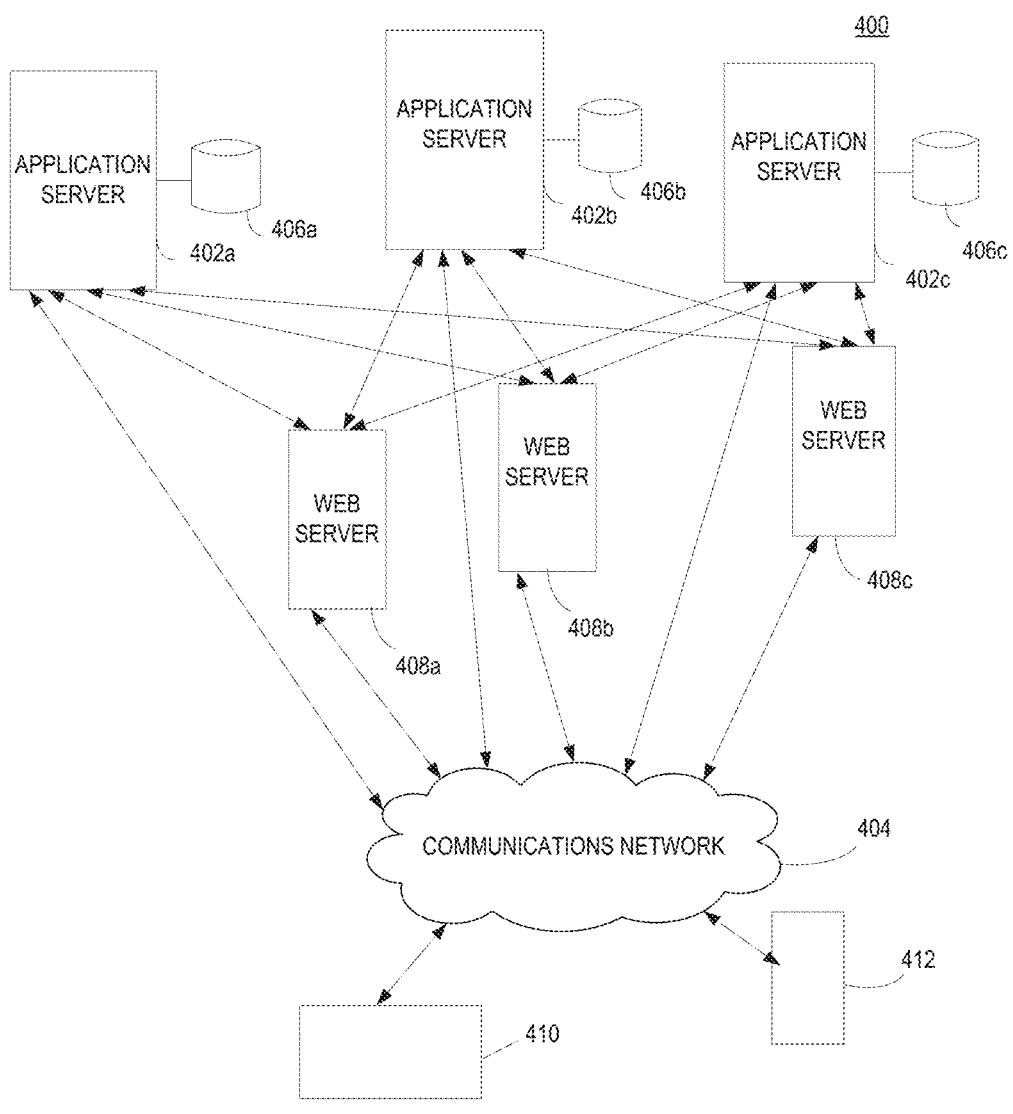

FIG. 3 depicts an example embodiment of an example component level example hardware architecture for an example computing device as may be used for any of various example hardware subsystem components of an example system, according to one example embodiment; and FIG. 4 depicts an example embodiment illustrating an example system level hardware architecture for an example application server, web server embodiment of an example service provider system for providing an example software architecture of various example subsystem components of an example networking system, which may be used to implement, according to one example embodiment.

DETAILED DESCRIPTION OF THE INVENTION

The various embodiments of the invention described herein should not be limited to the description, even with reference to the accompanying figures and drawings depicted, but only with respect to the claims. The invention may be embodied in different forms and should not be restricted as set forth here.

Figure 1:
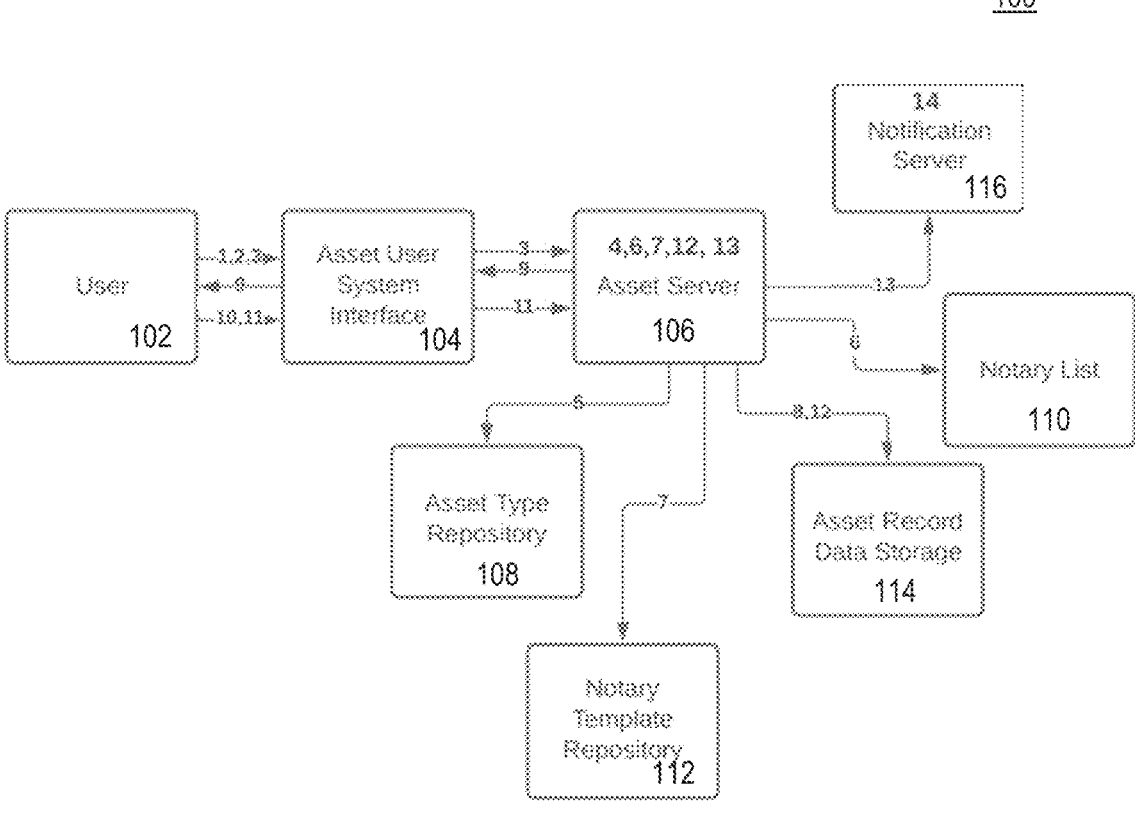
FIG. 1 is an example embodiment of an example flowchart showing an illustrative method for registering an example Digital Asset, which may include assigning example Notary Event Recipes to that example asset, according to one example embodiment.

FIG. 1 is an example embodiment of an example flowchart 100 showing an illustrative method for registering an example Digital Asset, which may include assigning example Notary Event Recipes to that example asset, according to one example embodiment.

For this disclosure, according to an example embodiment, an example method may be described that may involve an example Digital Asset as a data record that may be expected to undergo events that may identify and describe changes to the data record over some duration of time, according to an example embodiment. A Digital Asset can represent, e.g., but not limited to, a person, event, data, process, or subject, etc., and/or entity, according to an example embodiment. The Digital Asset, according to an example embodiment, for this example of the disclosure may include, according to an example embodiment, an example dossier component with contents as an example collection of data and documents to add to the representation of the digital asset where the changes or events may be recorded through a digital journal and/or case history method such as, e.g., but not limited to, a blockchain ledger and logging system, according to an example embodiment. The Digital Asset, according to an example embodiment, can be assigned arbitrary data types as an aggregate of digital artifacts such as, e.g., but not limited to, documents or paperwork, identities of involved parties with the asset, other related digital assets, dependencies on other assets, and so on, etc., according to an example embodiment. For a particular use case, according to an example embodiment, documents may be collected from file transfer and uploads combined with data elements, which may be received from an Internet of Things (IoT) network where, e.g., but not limited to, both document and data element types may be assigned, as the contents of the dossier, according to an example embodiment.

The data record may be expected to have one or more unique identifiers assigned to the Digital Asset, according to an example embodiment. The data record, according to an example embodiment, may be expected to have one or more change events or further data assignments, all of which, and/or, each may require, according to an example embodiment a digital notary process, according to an example embodiment. According to an example embodiment, the specifics of the data contents or dossier for the Asset may not be required for the disclosed example method, according to an example embodiment. Referring to FIG. 1, the user 102, according to an example embodiment, while creating a Digital Asset, may assign the specific content, including such artifacts, according to an example embodiment. For creating or editing a Digital Asset, according to an example embodiment, a Digital Asset Type can be assigned to that Digital Asset, according to an example embodiment. Based on this assigned type, according to an example embodiment, the Digital Asset can be generated from an Asset Type template that may include, according to an example embodiment, artifacts and/or may include notary assignments to those artifacts, according to an example embodiment. This process, according to an example embodiment, may be illustrated in the block diagram 100 depicted in the illustration of FIG. 1 and may be described in the following flow description, according to one example embodiment. This block diagram and flow description, according to an example embodiment, may identify the functional allocations to the services, which may be called microservices, according to an example embodiment, that may include, according to an example embodiment, the system for the disclosed method, according to an example embodiment. These microservices, according to an example embodiment, may be implemented as an example RESTful Web Services that may provide example application programming interfaces (APIs) using example JSON (JavaScript Object Notation), a lightweight data-interchange format, for resource representation, according to an example embodiment. The services, according to an example embodiment, may include the following.

an example Asset Server 106—which may create, read, update, and delete (CRUD) API and functions, according to an example embodiment, for an example Digital Asset that may coordinate with other services to complete the functions, according to an example embodiment.

An example Asset User System Interface 104, which according to an example embodiment may provide the example user graphical user interface (GUI), secured hypertext transport protocol secure (HTTPs) connection, and/or coupling, and the client-server interface code for typical interaction and data conversion, according to an example embodiment.

an example Asset Event Processor 106 or Asset server 106 or Asset Device 106, which, according to an example embodiment, may receive events, may identify the Assets for the events, and may process the assigned Notary Recipe for performing notary functions, according to an example embodiment.

An example Asset Type Repository 108, according to an example embodiment, which may store e.g., but not limited to, an example searchable collection of templates that may include blueprints and/or types for constructing example Asset instances, according to an example embodiment.

an example Notary Template Repository 112, according to an example embodiment, which may store, e.g., but not limited to, an example searchable collection of example templates that may include blueprints and/or types for example notary recipes that may be assigned to an Asset, according to an example embodiment.

an example Asset Record Storage 114 or Asset Record Data Storage 114, according to an example embodiment, which may after a Digital Asset is created, may save the Digital Asset to the example storage and may be enabled to allow access and/or retrieval from the example Asset Record Storage 114 that can be implemented as an example searchable database, file system, and/or distributed ledger blockchain system, according to an example embodiment.

an example Notary List 110, according to an example embodiment, which may store, e.g., but not limited to, an example searchable collection of an example Asset's dossier, which, according to an example embodiment, may contain, e.g., but not limited to, one or more notary recipes corresponding to the data or documents owned by the Asset, according to an example embodiment.

an example Notification Server 116, according to an example embodiment, which may, e.g., but not limited to, disseminate example messages (e.g., electronic messages such as, e.g., but not limited to, electronic mail (e-mail), and/or small message system (SMS) protocol texts, and/or multimedia message system (MMS) protocol format messages, notifications, alerts, etc., according to an example embodiment) that may be related to, e.g., but not limited to, the status, events, and/or changes to a example Digital Asset to registered Party members for the example Asset, according to an example embodiment.

The block diagram depicted in FIG. 1 shows an illustrative example of the interactions between these system components 102-116, in an example step-by-step process for registering a Digital Asset and/or assigning Notary Event Recipes to that asset, according to an example embodiment.

1. The user 102, according to an example embodiment, may input and assign to create a Digital Asset at the Asset User System Interface 104, according to an example embodiment.

2. The user 102 may input data describing the Digital Asset, which may be captured by the electronic system, which may identify several affiliated parties, and can assign the Digital Asset Type to the Asset Server 106, according to an example embodiment.

3. The user 102, according to an example embodiment, may select to proceed with further entries to the Asset Server 106 through the Asset User System Interface 104, according to an example embodiment.

4. The Asset Server 106, according to an example embodiment, may process the user inputs and may create an Asset Record, according to an example embodiment.

5. For the Digital Asset Type, the Asset Server 106, according to an example embodiment, may match that type with an Asset Template in the Asset Type Repository 108, according to an example embodiment.

6. Using the Template, the Asset Server 106, may create the Dossier of data and documents prescribed by the template, according to an example embodiment, that may include a data entry identifying a document or the document itself such as, e.g., but not limited to, a digital form as a PDF document, and may place it in the Notary List 110, according to an example embodiment.

7. Using the Template, the Asset Server 106, according to an example embodiment, may identify and/or assign Notary Assignments from Notary List 110 to specific items in the Dossier, according to an example embodiment, as may be matched and/or prescribed, etc., from the Notary Template Repository 112, according to an example embodiment.

8. The Asset Server 106, according to an example embodiment, may save the Digital Asset that may include the aggregation of the user data input, the Dossier, and/or the Notary Assignments, according to an example embodiment, to the Asset Record Data Storage 114, according to an example embodiment.

9. The Asset Server 106, according to an example embodiment may provide the response to the user 102 from step 3 above including the Asset Server 106 aggregation contents and the selection for Notary specifications, and it may be delivered via the Asset User System Interface 104, according to an example embodiment.

10. The user 102, according to an example embodiment, may review and/or can modify the Asset data and for this flow the user may select, according to an example embodiment, several documents from the dossier for a Second Notary, according to an example embodiment, and for the Notary for multiParty signatures, according to an example embodiment.

11. The user 102, according to an example embodiment, may select to save the Digital Asset data to the Asset Server 106, according to an example embodiment.

12. The Asset Server 106, according to an example embodiment, may process the user inputs, may merge the modifications with the existing Record, and may save this Record update with the Asset Record Data Storage 114, according to an example embodiment.

13. The Asset Server 106, according to an example embodiment, may generate an update event message and may transmit that to the Notification Server 116, according to an example embodiment.

14. The Notification Server 116, according to an example embodiment, may receive and may transmit the event message to affiliate parties of the Digital Asset, according to an example embodiment.

Figure 2:
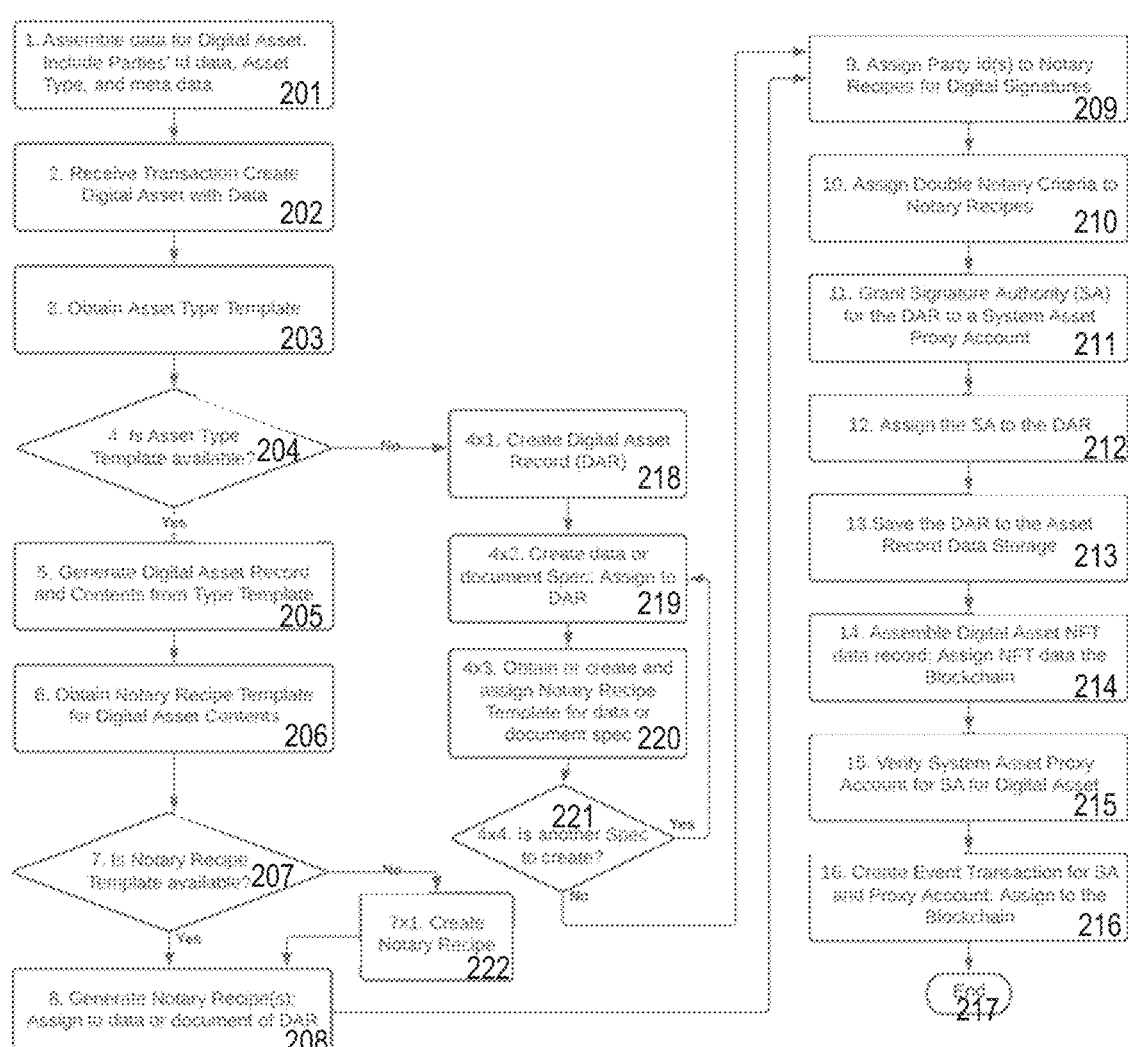
FIG. 2 is an example embodiment of an example flowchart showing more example detailed steps of an example logical process flow, according to one example embodiment.

FIG. 2 is an example embodiment of an example flowchart 200 showing more example detailed steps of an example logical process flow, according to one example embodiment.

The logical process flow 200, according to an example embodiment, is further described in more detail that corresponds to the diagram 200 in FIG. 2, according to an example embodiment.

In 201, flow diagram 200 may include 1. According to an example embodiment, the flow diagram may include, according to an example embodiment assembling data for Digital Asset, which may include, according to an example embodiment, Parties' Id data, Asset Type, and/or meta data, etc., and may continue with 202, according to an example embodiment.

The user 102, according to an example embodiment, may provide data through the GUI field 104 and form inputs, to an example service provider device processor device, according to an example embodiment.

In 202, flow diagram 200 may include 2. According to an example embodiment, the process may include, according to an example embodiment, receiving a Transaction "Create Digital Asset with Data", and may continue with 203, according to an example embodiment.

The API call, according to an example embodiment, may be received from the user through the Asset User System Interface that may include, according to an example embodiment, an example JSON resource representation for the contents of the Digital Asset, according to an example embodiment.

In 203, flow diagram 200 may include 3. According to an example embodiment, the process may include obtaining Asset Type Template, and may continue with 204, according to an example embodiment.

In the most general perspective, according to an example embodiment, an Asset may include, according to an example embodiment, a unique identifier, name, and an owner, according to an example embodiment. From this basic assignment, according to an example embodiment, an Asset Type called "Minimal" may include a data template that may have fields, including, e.g., but not limited to, according to an example embodiment:

'asset_id', 'asset_name', 'owner', and/or 'create_date', and/or a free form text field "description", according to an example embodiment. These data contents, according to an example embodiment, can be described in different type of data formats including, e.g., but not limited to, JSON, YAML, and various other schemas, etc., according to an example embodiment. This Type, according to an example embodiment, is not typical compared with examples Digital Asset types such as, e.g., but not limited to, photos, videos, cad design file, word document, pdf file, and the like, according to an example embodiment. However, the "Minimal" type may be sufficient enough for defining the notary events that may be applied to it as described in steps 6 and 8, according to an example embodiment.

In 204, flow diagram 200 may include a determination 4 for 'Is Asset Type Template available?', according to an example embodiment, may be performed, and if determined yes may continue with 205, or if not may continue with 218.

The user may, according to an example embodiment, select the Asset Type through the GUI from a list of those example types that may originate from the Asset Type Repository and then may be presented at the GUI, according to an example embodiment.

A selected option, according to an example embodiment, may include for "none" or "custom" may result in the "No" evaluation here, according to an example embodiment. The "No" evaluation may proceed with 218, according to an example embodiment, to create a blank Digital Asset Record in step 4×1 218, and may proceed, according to an example embodiment, to 219, to create the data fields in 4×2, 219, identified in step 3 203, and may be combined further, according to an example embodiment, with dossier data and/or documents for the Digital Asset, and, according to an example embodiment, may also be in step 4×1 218, according to an example embodiment.

In step 4×3, 220, Notary Recipes, according to an example embodiment, may be assigned that correspond to one or more entries in the dossier, and may continue with 221, according to an example embodiment.

Not all dossier entries, according to an example embodiment, may require notary, according to an example embodiment. These entries, according to an example embodiment, may include a back-and-forth with the user through GUI interactions, led by the computer processor of the service provider device through prompted interactions, or can be specified in step 1, 201, and, according to an example embodiment, may be passed in as JSON content at that first API call, according to an example embodiment.

The evaluation in step 4×4, 221, according to an example embodiment, can be for another set of user-GUI interaction(s) and/or iteration(s) through the passed in JSON data contents, and if another Spec to create exists then may continue with 219, or if not then may continue with 209, according to an example embodiment.

In 205, flow diagram 200 may include 5. According to an example embodiment, an example Generate Digital Asset Record (DAR) and Contents from Type Template A DAR data record may be created, and may continue with 206, according to an example embodiment.

Using the Type Template, the specified fields and the specified dossier data and documents, may be created and may be assigned to the DAR, according to an example embodiment.

This, according to an example embodiment, may include a blank form DAR that may be filled in with the data provided in the API call originating from step 1, 201, according to an example embodiment.

In 206, flow diagram 200 may include 6. According to an example embodiment, the process may include Obtain Notary Recipe Template for Digital Asset Contents, and may continue with 207, according to an example embodiment.

The dossier data and documents, according to an example embodiment, may be candidate items for notarization, according to an example embodiment. The Notary Recipe, according to an example embodiment, may identify which candidates may be required to be notarized and/or, according to an example embodiment, may include the specifics regarding notarization activities, e.g., including digital signatures, according to an example embodiment.

In 207, flow diagram 200 may include a determination 7. The process may further include, e.g., but not limited to, Is Notary Recipe Template available? determination, and if determined to be yes, then may proceed to 208, or if determined to be not, then may proceed to 222, according to an example embodiment.

For one or more data or documents, according to an example embodiment, a matching Recipe may not be found in 207. In 222, step 7×1, according to an example embodiment, a Recipe may be created with the user through GUI interactions, requesting and receiving input from the user, and may continue with 208, according to an example embodiment.

The newly created Recipe, according to an example embodiment, may be assigned to the data or documents and can be further registered with the Notary Recipe Template Repository 112 for re-use for similar types of data or documents, according to an example embodiment.

In 208, flow diagram 200 may include 8. The process may further include, e.g., but not limited to, Generate Notary Recipe(s); Assign to data or document of DAR, and proceed to 208, according to an example embodiment.

From the Recipe Template 207, if available, a Notary Recipe is created and assigned to the data or documents 208, which makes it part of the DAR, according to an example embodiment, and may continue with 209.

In 209, flow diagram 200 may include 9. The process 200 may further include, e.g., but not limited to, Assign Party Id(s) to Notary Recipes for Digital Signatures, and may continue with 210, according to an example embodiment.

For notarization, each data or document in the DAR may be independently evaluated from each other. A notarization typically requires a signature from a person who is uniquely identified by their digital Party Id., according to an example embodiment.

A Certificate Authority through PKI, according to an example embodiment, may typically issue unique ids (e.g., identifiers, keys, etc.) as, e.g., but not limited to, a symmetric digital identifier comprised of a private and public key, according to an example embodiment. The Party Id, i.e., their public key, the Party's name, and/or some other identifying data, according to an example embodiment, which may be assigned to the data or document, according to an example embodiment.

According to an example embodiment, the private key is not part of this Notary Recipe since the signer must always securely keep that for himself or herself, according to an example embodiment.

More than one Party Id, according to an example embodiment, can be required for the notarization of a data or document, according to an example embodiment.

In 210, flow diagram 200 may include 10. The process, according to an example embodiment, may further include, e.g., but not limited to, Assign Double Notary Criteria to Notary Recipes, and may continue with 211, according to an example embodiment.

The notary of the data or document may involve the Proof Existence and the Proof of Ownership or affiliation, according to an example embodiment.

In summary, the digital notarization may be performed as follows, according to an example embodiment: the hash of the document may be computed, the hash may be digitally signed with the designated Parties with their Party Ids, and the hash may be saved with the signatures and other metadata or descriptions to the blockchain DLT, according to an example embodiment. This notarization, according to an example embodiment, can be supplemented with another separate, blockchain DLT, according to an example embodiment. Some of the reasons for doing this may include, e.g., but not limited to, according to an example embodiment: 1) All Parties may not have permission access to the first blockchain DLT, so they may not be able to query or verify their DLT entries, according to an example embodiment. However, a second DLT can offer permission for the Parties, according to an example embodiment; 2) In the unlikely event that the first DLT is out of service, the second DLT is available, according to an example embodiment; and 3) unrelated Parties, such as auditors or authorized reviewers, may not have access to the first DLT, but can perform their audits on the second DLT data with the trust that a copy from the first DLT has been committed to the second DLT, etc., according to an example embodiment.

A selection for a Double Notary can be assigned from the Recipe Template or obtained from the Party through GUI interactions, according to an example embodiment.

In 211, flow diagram 200 may include 11. The process may further include, e.g., but not limited to, Grant Signature Authority (SA) for the DAR to a System Asset Proxy Account, and may continue with 212, according to an example embodiment.

The user through GUI interactions, according to an example embodiment, can digitally sign a document in a manual step-by-step process, according to an example embodiment.

Alternatively, a document can be automatically digitally signed if the Party provides for the authorization and conditions for the automation, according to an example embodiment. This situation arises for several reasons, according to an example embodiment: 1) the Party's identity private key is protected and not available for the transaction because of that protection, according to an example embodiment, 2) the Party is faced with numerous repeating notarizations that would impact the speed of business operations if done manually, according to an example embodiment, 3) the Party is not available to manually participate for some duration of time, according to an example embodiment, and/or 4) the data or document has already been signed by the Party, etc., according to an example embodiment.

For the automation process, the Party can assign a separate account, called a System Asset Proxy Account, that may operate as a normal account, contains a private-public key pair obtained through, according to an example embodiment, PKI from a trusted Certificate Authority, may be secured by cyber security, according to an example embodiment, may be securely accessed by the Party, and may be granted express permission by the Party to provide digital signatures for limited conditions for a limited duration, according to an example embodiment. This expressed permission, according to an example embodiment, may be a record of the Proxy Account assignment granting signature authority (SA) and, according to an example embodiment, may be saved to the blockchain, according to an example embodiment.

If the Party already has a Proxy Account, then, according to an example embodiment, that Proxy Account can be used with the Party's approval through GUI interactions, according to an example embodiment.

In 212, flow diagram 200 may include 12. The process may further include, e.g., but not limited to, Assign the SA to the DAR, and may continue with 213, according to an example embodiment.

The SA record, according to an example embodiment, may be assigned to data or documents identified in the Notary Recipe for the Party in the DAR, according to an example embodiment.

In 213, flow diagram 200 may include 13. The process may further include, e.g., but not limited to, save the DAR to the Asset Record Data Storage, and may continue with 214, according to an example embodiment The DAR can be saved to many types of data storage as file in a file system, SQL database, document database, NoSQL file format, and in a blockchain, according to an example embodiment. NoSQL may include, according to an example embodiment, a traversal graph database in some example embodiments for performance advantage scalability.

Due to the record size of the DAR and the parts that may require query and update operation, the DAR may be saved in multiple parts with the data elements and Notary Recipe saved to a relational database for example, and the larger sized, associated documents stored in file or data object system, according to an example embodiment. A transaction record of the save DAR transaction may be created, according to an example embodiment. Combined with additional metadata describing the transaction, the transaction record is saved to the blockchain that includes computed hashes for the parts that can be digitally signed by designated parties and cryptographic links to the parts, according to an example embodiment.

In 214, flow diagram 200 may include 14. The process may further include, e.g., but not limited to, Assemble Digital Asset NFT data record; Assign NFT data the Blockchain. A non-fungible token (NFT), according to an example embodiment, may include a record in the blockchain with unique identification codes, digital signatures by designated parties, and metadata that distinguishes it from other NFTs, and may continue with 215, according to an example embodiment.

NFTs are proof of ownership, according to an example embodiment.

NFTs are typically used to represent something else. For the physical world, items include artwork, real estate, vehicles, and so forth that can be tokenized for its representation, according to an example embodiment.

NFTs represent any kind of asset including digital assets such as the DAR, according to an example embodiment.

NFTs are token in the blockchain that implement these token standards: ERC721, ERC1155, TRC 721, according to an example embodiment.

The DAR is converted into a data format and contents conformant with the ERC721 and ERC1155 standards forming the DAR NFT, according to an example embodiment.

The DAR NFT is saved to the blockchain, according to an example embodiment.

In 215, flow diagram 200 may include 15. The process may further include, e.g., but not limited to, Verify System Asset Proxy Account for SA for Digital Asset, and may continue with 216, according to an example embodiment The Proxy Account is verified by the Party through several techniques including a confirm code sent by email or messaging to the Party. The Party is presented with a field in the GUI to confirm with the received code, according to an example embodiment.

The Proxy Account can then create a mock signature event on a mock document. The Party is informed through the GUI after the confirm code is acknowledged, according to an example embodiment.

The Party receives another email or messaging with a signed hash that has been signed by the Proxy Account, according to an example embodiment.

The Party is presented with a field to copy in the signed hash. The signed hash is verified with the Proxy Account and indicated on the GUI for the verification, according to an example embodiment.

In 216, flow diagram 200 may include 16. The process may further include, e.g., but not limited to, Create Event Transaction for SA and Proxy Account; Assign to the Blockchain, and may continue immediately with 217, and may immediately end, according to an example embodiment.

The verification that involved the mock document and mock can be saved to the blockchain as an initial record for the DAR record stored earlier in step 13, according to an example embodiment.

The completion of all Proxy Accounts, if there are one or more, indicates the start of the DAR for the notarization process, according to an example embodiment.

Respond to Digital Asset Event for Notary Processing Example Embodiment

Transactions, according to an example embodiment, can be received through data communications of various means including, e.g., but not limited to, Internet of Things (IoT) data networks, API calls, file transfer programs and streaming, etc., according to an example embodiment.

After the transaction is received, verified, and validated in step 1 201, the contents including the Request, Digital Asset identifier, and document type are extracted in step 2 202, according to an example embodiment. For this description, the Request is an Update for a registered Digital Asset that may include, e.g., but not limited to, a file upload to be assigned to the Digital Asset, according to an example embodiment. The identifier is used to query and obtain the Digital Asset Record (DAR) in the system, according to an example embodiment. If there is not a match for the identifier in step 3 203, an error message, according to an example embodiment, may be generated in step 3 203, according to an example embodiment, the error may be reported through one or more notifications (e.g., but not limited to, electronic communications/alerts/messages/chats/texts/emails, etc.), and the message may be saved to the example data log, according to an example embodiment.

For the matched DAR in step 4 204, the document type is used to match for a Notary Recipe that contains instructions for fulfilling the Request, according to an example embodiment.

FIG. 3 depicts an example embodiment of a hardware architecture block diagram 300 for an example computing or communications device as may be used for any of various example buyer devices, example seller devices, example financial institution devices, example nonfungible token (NFT) devices, notification and/or authentication devices, example SmartHub devices, cryptocurrency exchange devices, as well as example computing devices of users, mobile devices, network communication components, routers, gateways, etc., according to an example embodiment of the present invention.

FIG. 3 depicts an exemplary schematic block diagram 300 illustrating an exemplary computer/communications device hardware architecture as may be used in various exemplary components of an exemplary embodiment including user devices various example buyer devices, example seller devices, example financial institution devices, example nonfungible token (NFT) devices, notification and/or authentication devices, example SmartHub devices, cryptocurrency exchange devices, as well as example computing devices of users, mobile devices, network communication components, routers, gateways, etc., computer device(s), bank devices, merchant devices, payment service provider devices, other computing or communications devices, routers, application servers, web servers, cloud-based computing devices, communication devices, switches, routers, gateways, telephone devices, mobile devices, content servers, web servers, database servers and/or other application servers, end-user devices, operations center devices, client and/or server devices, network routers, gateways, access points, and the like, according to various exemplary embodiments.

FIG. 3 depicts an exemplary schematic block diagram 300 illustrating an exemplary computer/communications device hardware architecture as may be used in various exemplary components of an exemplary embodiment including mobile devices, wearables, cloud-based computing devices, content servers, web servers, database servers and/or other application servers, according to various exemplary embodiments. Diagram 300 may include any of various exemplary computer systems as may be used as an external computer device, an internal and/or STB or SOC, a mobile device, a wearable, a client, or server, web server, application server, and/or any other of the computing devices included in the other drawings, according to various exemplary embodiments. FIG. 3 depicts an exemplary diagram 300 illustrating an exemplary computer/communications device hardware architecture as may be used in various components of exemplary embodiments of the present invention. FIG. 3 depicts an exemplary view 300 of exemplary computer systems such as those represented in FIGS. 1-2, 4, etc., including devices which may execute various modules, including components, systems, devices, computers, processors, mobile devices, routers, gateways, network devices, other computing and/or network devices, network monitoring and security operations data analysis computing devices which may execute various operating system and software components on such computing devices and/or subsystem devices and hardware/software modules as may be represented by devices implied by, or perform steps illustrated in various flowchart diagrams as illustrated in the figures by elements 101-113, 201-205, 300, 400, etc., as may be used in implementing an exemplary embodiment of the present invention. FIG. 3 depicts an exemplary embodiment of a computer system that may be used in computing devices including those shown and not shown, such as, e.g., but not limited to, service provider computing devices, SmartHub systems, buyer computing devices, supplier computing devices, digital financial services computing devices, public blockchain for proxy nft computing devices, data repository processing and/or storage computing devices, network devices, communication devices, authentication devices, notification devices, requesting devices, response devices, cryptocurrency exchange related devices, NFT related devices, traditional financial services and/or fiat currency processing computing devices, electronic funds transfer (EFT) related devices, network monitoring and analysis devices of example operations illustrated example environment 400, computing devices 300, devices, servers, application servers, web servers, other wearable and/or mobile devices, sensor capture devices, routers, gateways, data network communication equipment, according to an exemplary embodiment of the present invention. FIG. 3 depicts an exemplary embodiment of a computer system that may be used as client device, a server device (not shown), a network component, router, packet monitor/analyzer, server device, storage, and/or cloud based storage device, application servers, and/or web servers, etc. The present invention (or any part(s) or function(s) thereof) may be implemented using hardware, software, firmware, or a combination thereof and may be implemented in one or more computer systems or other processing systems. In fact, in one exemplary embodiment, the invention may be directed toward one or more computer systems capable of carrying out the functionality described herein. An example of a computer system 300 is shown in FIG. 3, depicting an exemplary embodiment of a block diagram of an exemplary computer system useful for implementing the present invention. Specifically, FIG. 3 illustrates an example computer 300, which in an exemplary embodiment may be, e.g., (but not limited to) a personal computer (PC) system running an operating system such as, e.g., (but not limited to) WINDOWS MOBILE™ for POCKET PC, or MICROSOFT® WINDOWS® NT/98/2000/XP/CE/7/8/10, etc. available from MICROSOFT® Corporation of Redmond, Wash, U.S.A., SOLARIS® from SUN® Microsystems of Santa Clara, Calif, U.S.A, OS/2 from IBM® Corporation of Armonk, N.Y, U.S.A, Mac/OS, Mac OSX, iOS, from APPLE® Corporation of Cupertino, Calif, U.S.A, etc., or any of various versions of UNIX® (a trademark of the Open Group of San Francisco, Calif, USA) including, e.g., LINUX®, UBUNTU, HPUX®, IBM AIX®, and SCO/UNIX®, etc., ANDROID, Android OS is available from Google, JAVA from Oracle, etc. However, the invention may not be limited to these platforms. Instead, the invention may be implemented on any appropriate computer system running any appropriate operating system. In one exemplary embodiment, the present invention may be implemented on a computer system operating as discussed herein. An exemplary computer system, computer 300 is shown in FIG. 3. Other components of the invention, such as, e.g., (but not limited to) a computing device, a communications device, a telephone, a personal digital assistant (PDA), a personal computer (PC), a handheld PC, client workstations, thin clients, thick clients, proxy servers, network communication servers, remote access devices, client computers, server computers, routers, web servers, data, media, audio, video, telephony or streaming technology servers, a tablet, a phone, a mobile phone, a cellular phone, a communications device, an iPhone, iOS, a smartphone, an iPad, a tablet based device, an ANDROID OS device, an iOS device, a Symbian based device, a Windows 8, 10, 11, etc., device, etc., may also be implemented using a computer such as that shown in FIG. 3.

The computer system 300 may include one or more processors, such as, e.g., but not limited to, processor(s) 304, which may include microprocessors, coprocessors, nanoprocessors, microcontrollers, systems on a chip (SOC), multiprocessor systems, parallel processors, CISC type processors, RISC type processors, POWER type processors, ARM-architecture processors, massively parallel processor, graphic processors (GPUs) 332, cryptographic processors such as, e.g., but not limited to, encryption/decryption processor 336, quantum computers, etc. The processor(s) 304 may be connected to a communication infrastructure 306 (e.g., but not limited to, a communications bus, crossover bar, or network, etc.). Various exemplary software embodiments may be described in terms of this exemplary computer system. After reading this description, it will become apparent to a person skilled in the relevant art(s) how to implement the invention using other computer systems and/or architectures.

Computer system 300 may include a display interface 302 that may forward, e.g., but not limited to, graphics, text, and other data, etc., from the communication infrastructure 306 (or from a frame buffer, etc., not shown) for display on the display unit 330, and/or GPU 332, and/or touchscreen 334, and/or other input or output, and/or input and output device, sensor-based device, etc.

The computer system 300 may also include, e.g., but may not be limited to, a main memory 308, random access memory (RAM), and a secondary memory 310, etc. The secondary memory 310 may include, for example, (but not limited to) a hard disk drive 312 and/or a removable storage drive2 314, representing a floppy diskette drive, a magnetic tape drive, an optical disk drive, a compact disk drive CD-ROM, DVD, Personal Cloud storage, redundant array of inexpensive disks (RAID) array, etc. The removable storage drive 314 may, e.g., but not limited to, read from and/or write to a removable storage unit 318 in a well-known manner. Removable storage unit 318, also called a program storage device or a computer program product, may represent, e.g., but not limited to, a floppy disk, magnetic tape, optical disk, compact disk, etc. which may be read from and written to by removable storage drive2 314. As will be appreciated, the removable storage unit 318 may include a computer usable storage medium having stored therein computer software and/or data.

In alternative exemplary embodiments, secondary memory 310 may include other similar devices for allowing computer programs or other instructions to be loaded into computer system 300. Such devices may include, for example, but not limited to, a removable storage unit 322 and an interface 320. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, FLASH memory, application specific integrated circuits (ASICs), field programmable gate arrays (FPGAs), and/or other removable storage units 322 and interfaces 320, which may allow software and/or data to be transferred from the removable storage unit 322 to computer system 300.

The computing device 300 may also include a cloud-accessible or cloud-based processing and/or storage solution as may be available from Amazon Web Services available from Amazon of Seattle, WA USA, or Azure cloud available from Microsoft Corporation of Redmond, WA USA, or Google Cloud Service available from Google of Alphabet Corporation, Mountain View, CA USA, among many other network and software communications offerings available from IBM Corporation, Oracle Corporation, and others.

Computer 300 may also include an input device such as, e.g., (but not limited to) a mouse or other pointing device such as a digitizer, touch-based sensor, and/or a keyboard and/or other data entry device (none of which are labeled).

Computer 300 may also include output devices, such as, e.g., (but not limited to) display 330, and display interface 302. Computer 300 may include input/output (I/O) devices such as, e.g., (but not limited to) communications interface 324, cable 328 and communications path 326, etc. These devices may include, e.g., but not limited to, a network interface card, and modems (neither are labeled). Communications interface 324 may allow software and data to be transferred between computer system 300 and external devices. Examples of communications interface 324 may include, e.g., but may not be limited to, a modem, a network interface (such as, e.g., an Ethernet card), a communications port, a Personal Computer Memory Card International Association (PCMCIA) slot and card, etc. Software and data transferred via communications interface 324 may be in the form of signals 328 which may be electronic, electromagnetic, optical or other signals capable of being received by communications interface 324. These signals 328 may be provided to communications interface 324 via, e.g., but not limited to, a communications path 326 (e.g., but not limited to, a channel). This channel 326 may carry signals 328, which may include, e.g., but not limited to, propagated signals, which may be stored in nontransitory form, and may be implemented using, e.g., but not limited to, wire or cable, local and/or wide area network (LAN/WAN) protocols, Ethernet, Token Ring, FDDI, carried over andy of various physical media, fiber optics, a telephone line, twisted pair, shielded twisted pair, a cellular link, a radio frequency (RF) link, wireless communications, spread spectrum, orthogonal frequency division multiplexing (OFDM), and/or other communications channels, etc.

In this document, the terms "computer program medium" and "computer readable medium" may be used to generally refer to media such as, e.g., but not limited to removable storage drive 314, a hard disk installed in hard disk drive 312, and signals 328, etc. These computer program products may provide software to computer system 300. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct or indirect physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device modified as set forth herein to perform the processing as described to be selectively activated or reconfigured by a software program stored in the device to become a special purpose device capable of performing the subsystem's or submodule's performance functionality and computer and communications systems instructions, and/or by hardware processing such as, e.g., but not limited to, performing certain trusted platform system processing, including exemplary key based encryption/decryption, network monitoring, packet inspection and the like, according to exemplary embodiments.

Embodiments of the invention may be implemented in one or a combination of hardware, firmware, and software. Embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.) when nontransitory, and others.

Computer programs (also called computer control logic), may include object-oriented computer programs, and may be stored in main memory 308 and/or the secondary memory 310 and/or removable storage units 314, also called computer program products. Such computer programs, when executed, may enable the computer system 300 to perform the features of the present invention as discussed herein. In particular, the computer programs, when executed, may enable the processor 304 to provide a method to resolve conflicts during data synchronization according to an exemplary embodiment of the present invention. Accordingly, such computer programs may represent controllers of the computer system 300.

Various artificial intelligence based analysis techniques may be used herein including neural networks, machine learning, any of various well-known AI and ML techniques and processes (e.g., reinforcement learning, dynamic programming, state action reward state action (SARSA), q learning, supervised learning, unsupervised learning, large language models (LLMs), natural language search and interactive request and response, neural networks, convolutional neural networks, statistical heuristics, topic identification and classification, linguistics and semantic processing, tensorflow and openAI libraries, cloud computing services, specific APIs, Microsoft cognitive services, Google cloud AI, Watson AI, offerings from Amazon, Facebook, Baidu, Apple, and others, etc.), and output of such algorithms may be analyzed further as set forth herein to obtain feature vectors and other data which may be used to provide further guidance to users, and/or be integrated for further processing and analysis, authentication, access control, and/or encryption/decryption processing, and coupled via decision support systems, executive information systems, and other graphical user interface enabled network and cyber security monitoring and threat analysis management and processing.

In another exemplary embodiment, the invention may be directed to a computer program product may include a computer readable medium having control logic (computer software) stored therein. The control logic, when executed by the processor 304, may cause the processor 304 to perform the functions of the invention as described herein. In another exemplary embodiment where the invention may be implemented using software, the software may be stored in a computer program product and loaded into computer system 300 using, e.g., but not limited to, removable storage drive 314, hard drive 312 or communications interface 324, etc. The control logic (software), when executed by the processor 304, may cause the processor 304 to perform the functions of the invention as described herein. The computer software may run as a standalone software application program running atop an operating system or may be integrated into the operating system.

In yet another embodiment, the invention may be implemented primarily in hardware using, for example, but not limited to, hardware components such as application specific integrated circuits (ASICs), or one or more state machines, etc. Implementation of the hardware state machine so as to perform the functions described herein will be apparent to persons skilled in the relevant art(s).

In another exemplary embodiment, the invention may be implemented primarily in firmware.

In yet another exemplary embodiment, the invention may be implemented using a combination of any of, e.g., but not limited to, hardware, firmware, and software, etc.

Exemplary embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

According to an exemplary embodiment, the application system can include an electronic decision support system (DSS) (not shown), policy-based trust platform systems, which can interact, e.g., but not limited to, with computer database management system (DBMS) 307, and/or electronic interactive, graphical user interface (GUI) system. Each of the exemplary DSS, DBMS and/or EIGUI system, can then, using e.g., but not limited to, a cryptographic processor and/or a crypto chip controller processor 336, or the like, can then encrypt the data using electronic encryptor, which can make use of one or more cryptographic algorithm electronic logic, which can include encryption code, a cryptographic combiner, etc., and may be stored in encrypted form, according to an exemplary embodiment, in a computer database storage facility, from computer database storage device, and from there the process can continue with use of the cryptographic algorithm electronic logic, and electronic decryptor, which can decrypt and/or provide a process for decrypting encrypted data, and/or by providing such data to the DSS, the DBMS, or the EIGUI, if authorized. By using encryption/decryption, certain algorithms can be used, as described herein, including, e.g., but not limited to, checksum, AES encryption, RSA, PKI, TLS, FTPS, SFTP, etc. and/or other cryptographic algorithms and/or protocols, according to exemplary embodiments.

Cryptographic Functions

Cryptographic systems, according to an exemplary embodiment, can provide one or more of the following four example services. It is important to distinguish between these, as some algorithms are more suited to particular tasks, but not to others. To protect patient data, personal data can be encrypted prior to storage and can be decrypted before accessing the data, according to an exemplary embodiment. When analyzing requirements and risks, one needs to decide which of the four functions should be used to protect the proprietary data, according to an exemplary embodiment.

Authentication

Using a cryptographic system, according to an exemplary embodiment, one can establish the identity of a remote user (or system). A typical example is the SSL certificate of a web server providing proof to the user device that user device is connected to the correct server, according to an exemplary embodiment.

The identity is not of the user, but of the cryptographic key of the user. Having a less secure key lowers the trust one can place on the identity, according to an exemplary embodiment.

Non-Repudiation

The concept of non-repudiation is particularly important for financial or e-commerce applications, according to an exemplary embodiment. Often, cryptographic tools are required to prove that a unique user has made a transaction request, according to an exemplary embodiment. It must not be possible for the user to refute his or her actions, according to an exemplary embodiment.

For example, a customer can request a transfer of money from her account to be paid to another account, according to an exemplary embodiment. Later, she claims never to have made the request and demands the money be refunded to the account. If one has non-repudiation through cryptography, one can prove—usually through digitally signing the transaction request, that the user authorized the transaction.

Confidentiality

More commonly, the biggest concern can be to keep information private, according to an exemplary embodiment. Cryptographic systems, according to an exemplary embodiment, have been developed to function in this capacity. Whether it be passwords sent during a log on process, or storing confidential proprietary financial data in a database, encryption can assure that only users who have access to the appropriate key can get access to the proprietary data.

Integrity

One can use cryptography, according to an exemplary embodiment, to provide a means to ensure data is not viewed or altered during storage or transmission. Cryptographic hashes for example, can safeguard data by providing a secure checksum, according to an exemplary embodiment.

Cryptographic Algorithms

Various types of cryptographic systems exist that have different strengths and weaknesses, according to an exemplary embodiment. Typically, the exemplary cryptographic systems can be divided into two classes; 1) those that are strong, but slow to run, and 2) those that are quick, but less secure. Most often a combination of the two approaches can be used, according to an exemplary embodiment (e.g.: secure socket layer (SSL)), whereby we establish the connection with a secure algorithm, and then if successful, encrypt the actual transmission with the weaker, but much faster algorithm.

Symmetric Cryptography

Symmetric Cryptography, according to an exemplary embodiment, is the most traditional form of cryptography. In a symmetric cryptosystem, the involved parties share a common secret (password, pass phrase, or key), according to an exemplary embodiment. Data can be encrypted and decrypted using the same key, according to an exemplary embodiment. These symmetric cryptography algorithms tend to be comparatively fast, but the algorithms cannot be used unless the involved parties have already exchanged keys, according to an exemplary embodiment. Any party possessing a specific key can create encrypted messages using that key as well as decrypt any messages encrypted with the key, according to an exemplary embodiment. In systems involving a number of users who each need to set up independent, secure communication channels, symmetric cryptosystems can have practical limitations due to the requirement to securely distribute and manage large numbers of keys, according to an exemplary embodiment.

Common examples of symmetric algorithms include, e.g., but not limited to, DES, 3DES and/or AES, etc. The 56-bit keys used in DES are short enough to be easily brute-forced by modern hardware and DES should no longer be used, according to an exemplary embodiment. Triple DES (or 3DES) uses the same algorithm, applied three times with different keys giving it an effective key length of 128 bits, according to an exemplary embodiment. Due to the problems using the DES algorithm, the United States National Institute of Standards and Technology (NIST) hosted a selection process for a new algorithm. The winning algorithm was Rijndael and the associated cryptosystem is now known as the Advanced Encryption Standard or AES, according to an exemplary embodiment. For most applications 3DES, according to an exemplary embodiment, is acceptably secure at the current time, but for most new applications it is advisable to use AES, according to an exemplary embodiment.

Asymmetric Cryptography (Also Called Public/Private Key Cryptography)

Asymmetric algorithms, according to an exemplary embodiment, use two keys, one to encrypt the data, and either key to decrypt. These inter-dependent keys are generated together, according to an exemplary embodiment. One key is labeled the Public key and is distributed freely, according to an exemplary embodiment. The other key is labeled the Private Key and must be kept hidden, according to an exemplary embodiment. Often referred to as Public/Private Key Cryptography, these cryptosystems can provide a number of different functions depending on how they are used, according to an exemplary embodiment.

The most common usage of asymmetric cryptography is to send messages with a guarantee of confidentiality, according to an exemplary embodiment. If User A wanted to send a message to User B, User A would get access to User B's publicly available Public Key, according to an exemplary embodiment. The message is then encrypted with this key and sent to User B, according to an exemplary embodiment. Because of the cryptosystem's property that messages encoded with the Public Key of User B can only be decrypted with User B's Private Key, only User B can read the message, according to an exemplary embodiment.

Another usage scenario is one where User A wants to send User B a message and wants User B to have a guarantee that the message was sent by User A, according to an exemplary embodiment. In order to accomplish this, User A can encrypt the message with their Private Key, according to an exemplary embodiment. The message can then only be decrypted using User A's Public Key, according to an exemplary embodiment. This can guarantee that User A created the message because User A is then the only entity who had access to the Private Key required to create a message that can be decrypted by User A's Public Key, according to an exemplary embodiment. This is essentially a digital signature guaranteeing that the message was created by User A, according to an exemplary embodiment.

A Certificate Authority (CA), whose public certificates are installed with browsers or otherwise commonly available, may also digitally sign public keys or certificates, according to an exemplary embodiment. One can authenticate remote systems or users via a mutual trust of an issuing CA, according to an exemplary embodiment. One can trust their 'root' certificates, according to an exemplary embodiment, which in turn authenticates the public certificate presented by the server.

PGP and SSL are prime examples of systems implementing asymmetric cryptography, using RSA and/or other algorithms, according to an exemplary embodiment.

Hashes

Hash functions, according to an exemplary embodiment, take some data of an arbitrary length (and possibly a key or password) and generate a fixed-length hash based on this input. Hash functions used in cryptography have the property that it can be easy to calculate the hash, but difficult or impossible to re-generate the original input if only the hash value is known, according to an exemplary embodiment. In addition, hash functions useful for cryptography have the property that it is difficult to craft an initial input such that the hash will match a specific desired value, according to an exemplary embodiment.

MD5 and SHA-1 are common hashing algorithms, according to an exemplary embodiment. These algorithms are considered weak and are likely to be replaced in due time after a process similar to the AES selection, according to an exemplary embodiment. New applications should consider using SHA-256 instead of these weaker algorithms, according to an exemplary embodiment.

Key Exchange Algorithms

There are also key exchange algorithms (such as Diffie-Hellman for SSL), according to an exemplary embodiment. These key exchange algorithms can allow use to safely exchange encryption keys with an unknown party, according to an exemplary embodiment.

Algorithm Selection

As modern cryptography relies on being computationally expensive to break, according to an exemplary embodiment, specific standards can be set for key sizes that can provide assurance that with today's technology and understanding, it will take too long to decrypt a message by attempting all possible keys, according to an exemplary embodiment.

Therefore, we need to ensure that both the algorithm and the key size are taken into account when selecting an algorithm, according to an exemplary embodiment.

FIG. 4 depicts an example application server and web server network architecture including an example fully meshed, redundant communications network load balancing application server architecture as may be used for an example SmartHub system service provider and/or a digital financial services and/or payment service provider, and may couple client devices such as, e.g., but not limited to, service provider, buyer devices, supplier devices, public blockchain, proxy NFT systems, data repository systems, authentication systems, ledger tracking systems, blockchain distributed ledge systems, NFT systems, SmartPass NFT authentication systems, notification systems, request response systems, financing request systems, collateralized NFT request response systems, etc. to example service devices using an example network infrastructure, according to an example embodiment of the present invention. FIG. 4 depicts an exemplary schematic block diagram 400 illustrating an exemplary communications network device hardware architecture 400 showing exemplary network devices including exemplary application server devices 402, exemplary storage devices 406, web server devices 408, all coupled to an exemplary communications network 404, which may be coupled to other devices such as, e.g., but not limited to, a cyber security network security operations environment device or devices 404, and other end user and other internal and/or external user computing and/or communications devices 410, which may be coupled to the network communications environment 404 by one or more physical devices not shown, such as, e.g., but not limited to, network interface cards (NICs), wireless local area network WLAN or wireless fidelity (WI-FI) (IEEE 802.11 communication technologies), physical wires, twisted pair, coaxial cable, fiber optic cable, and/or other communications network cabling, wireless communication access points and/or wireless antennae, wires, wireless media, routers, gateways, access points, exchange carrier facilities, modulator/demodulator (modems), modulating equipment, cellular network exchange devices, etc. Block diagram 400 may serve as an exemplary logical diagram of associated physical devices. Physical devices may communicate via one or more communications network software protocols via exemplary protocol languages or stacks which may correlate to the Open Systems Interconnect (OSI) stack of communication layers, such as, e.g., but not limited to, Internet Protocol (IP), transmission control protocol (TCP), among various other protocols including, e.g., but not limited to, TCP/IP protocols, UDP, hypertext transfer protocol (HTTP), file transfer protocol (FTP), security protocols (e.g., HTTPS, SFTP, FTPS, TLS, etc.), as will be apparent to those skilled in the relevant art. Various load sharing devices and port sharing devices may be used, as well as protocol tracing and packet tracing devices, which may be able to access such communications data and perform exemplary processing including packet inspection, deep packet inspection, network tracing, packet inspection (e.g., source and destination address, etc.) and the like. Such systems may be used to perform various blockchain related distributed ledger technologies so as to replicate data which may be encrypted and decrypted using various algorithms. Certain algorithms may be used which may be resilient to conventional decryption techniques, resilient to brute force attack decryption techniques, and/or may be resilient to quantum computing based decryption techniques. Such software and hardware network analysis and/or processing tools may be used to process communications network traffic internal to, and/or external from an exemplary entity organization and an exemplary network operations center (NOC) network monitoring organization may be able to analyze such network traffic to, e.g., process different types of traffic, using various sophisticated network operations tools and techniques as well as to perform various automated processing as described further herein.

Although example embodiments of the invention are illustrated and described herein as embodied in example embodiments, the invention should not be limited to the details shown in those example embodiments because various modifications and structural changes may be made without departing from the spirit of the invention while remaining within the scope and range of equivalents of the claims.

The construction and method of operation of various example embodiments of the claimed invention and additional features and/or advantages of various example embodiments of the invention are best understood from the following description of specific example embodiments when read in connection with the accompanying drawings.

Various exemplary embodiments of the invention are discussed in detail herein. While specific exemplary embodiments are discussed herein, it should be understood that this is done for illustration purposes only. A person skilled in the relevant art will recognize that other components and configurations can be used without parting from the spirit and scope of the invention.

What is claimed is:

1. A computer implemented method of registering digital assets for lifecycle events, notarizations, and responses, comprising at least one electronic computer processor coupled to at least one electronic memory storage device and coupled via at least one communications interface to at least one data communications network, the method comprising:

electronically receiving or assembling, by the at least one electronic computer processor of an asset server system, data for at least one digital asset comprising:

parties identification data, asset type, and metadata;

electronically receiving, by the at least one electronic computer processor, a transaction to create a digital asset with data request;

electronically obtaining, by the at least one electronic computer processor, at least one asset type template;

electronically determining, by the at least one electronic computer processor, availability of said at least one asset type template, and if said availability of said at least one asset type template is determined available, then proceeding, by the at least one electronic computer processor, to at least one or more of:

electronically generating, by the at least one electronic computer processor, at least one digital asset record (DAR) and contents from said at least one asset type template;

electronically obtaining, by the at least one electronic computer processor, at least one notary recipe template for digital asset contents;

electronically determining, by the at least one electronic computer processor, if said at least one notary recipe template is available and only if not available creating, by the at least one electronic computer processor, a notary recipe, wherein the notary recipe identifies candidates to be notarized and notarization activities; or electronically generating, by the at least one electronic computer processor, at least one notary recipe and assigning, by the at least one electronic computer processor, said at least one notary recipe to data or document of said at least one digital asset record (DAR); and if said availability of said at least one asset type template is determined not to be available, then proceeding, by the at least one electronic computer processor, to at least one or more of:

electronically creating, by the at least one electronic computer processor, said at least one digital asset record (DAR);

electronically creating, by the at least one electronic computer processor, said data or document specification and assigning, by the at least one electronic computer processor, said specification to said at least one digital asset record (DAR); or electronically obtaining, creating, or assigning, by the at least one electronic computer processor, said at least one notary recipe template for said data or document specification; and electronically assigning, by the at least one electronic computer processor, party identifiers to said at least one notary recipes for digital signatures;

electronically assigning, by the at least one electronic computer processor, double notary criteria to said at least one notary recipe;

electronically granting, by the at least one electronic computer processor, signature authority (SA) for said at least one digital asset record (DAR) to a system asset proxy account;

electronically assigning, by the at least one electronic computer processor, said signature authority (SA) to said at least one digital asset record (DAR);

electronically storing, by the at least one electronic computer processor, said at least one digital asset record (DAR) to at least one asset record data storage device;

electronically assembling, by the at least one electronic computer processor, at least one digital asset non-fungible token (NFT) data record, and assigning, by the at least one electronic computer processor, said at least one digital asset nonfungible token (NFT) data record to at least one NFT blockchain;

electronically verifying, by the at least one electronic computer processor, at least one system asset proxy account for said signature authority (SA) for said at least one digital asset; and electronically creating, by the at least one electronic computer processor, at least one event transaction for said signature authority (SA) and said at least one system asset proxy account, and electronically assigning, by the at least one electronic computer processor, said at least one event transaction to an at least one blockchain separate from the at least one NFT blockchain.

2. The method according to claim 1, wherein said digital asset is implemented as said at least one data asset record, and is expected to undergo events comprising:

identifying, and describing at least one change to said at least one data asset record representing said digital asset over a duration of time.

3. The method according to claim 1, wherein said digital asset comprises:

representing at least one or more of:
a person,
an event,
data,
a process, or
a subject.

4. The method according to claim 1, wherein said digital asset comprises:

wherein said digital asset is produced from a digital asset type, and wherein said digital asset type is encoded from:
a general data structure; and
a behavior pattern of a similar digital asset to said digital asset.

5. The method according to claim 1, wherein said digital asset type is analogous to a building blueprint, wherein the building blueprint is processed by a method to construct a data record to represent the digital asset.

6. The method according to claim 1, wherein said digital asset type comprises at least one template for artifact descriptions of an artifact, and further comprising at least one or more of:

identifying at least one notary assignment to the artifact; or validating the at least one notary assignment of the artifact to the Digital Asset.

7. The method according to claim 1, wherein said digital asset comprises:

a dossier component comprising:
a collection of data and documents to add to the representation of the digital asset,
wherein any change or any event is recorded through a digital journal,
wherein said digital journal comprises:
a case history method comprising:
a blockchain ledger, and
a digital logging system.

8. The method according to claim 1, wherein said digital asset is assigned an arbitrary data type as an aggregate of digital artifacts comprising at least one or more of:

documents,
paperwork,
identities of involved parties related to the digital asset,
other related digital assets, or
dependencies on other digital assets.

9. The method according to claim 1, further comprising:
collecting at least one document; and
combining the at least one document with at least one data
element received from an Internet of Things (IoT)
network,
wherein both said at least one document and an at least
one data element type of said at least one data
element are assigned as contents of a dossier.

10. A system of registering digital assets for lifecycle
events, notarizations, and responses, the system comprising:
at least one electronic computer processor of at least one
asset server, coupled to at least one electronic memory
storage device and coupled via at least one communi-
cations interface, coupled to at least one data commu-
nications network, the system comprising wherein said
at least one electronic computer processor is configured
to:
electronically receive or assemble, data for at least one
digital asset comprising:
parties identification data,
asset type, and
metadata;
electronically receive a transaction to create a digital
asset with data request;
electronically obtain at least one asset type template;
electronically determine availability of said at least one
asset type template, and if said availability of said at
least one asset type template is determined available,
then proceeding, by the at least one electronic com-
puter processor, to at least one or more of:
electronically generate at least one digital asset
record (DAR) and contents from said at least one
asset type template;
electronically obtain at least one notary recipe tem-
plate for digital asset contents;
electronically determine if said at least one notary
recipe template is available and only if not avail-
able create at least one notary recipe; or
electronically generate said at least one notary recipe
and assign said at least one notary recipe to data or
document of said at least one digital asset record
(DAR); and
if said availability of said at least one asset type template
is determined not to be available, then proceed to at
least one or more of:
electronically create said at least one digital asset
record (DAR);
electronically create said data or document specifica-
tion and assigning, by the at least one electronic
computer processor, said specification to said at least
one digital asset record (DAR); or
electronically obtain, create, or assign, said at least one
notary recipe template for said data or document
specification; and
electronically assign party identifiers to said at least one
notary recipes for digital signatures;
electronically assign double notary criteria to said at
least one notary recipe;
electronically grant signature authority (SA) for said at
least one digital asset record (DAR) to a system asset
proxy account;
electronically assign said signature authority (SA) to
said at least one digital asset record (DAR);
electronically store said at least one digital asset record
(DAR) to at least one asset record data storage
device;

electronically assemble at least one digital asset non-
fungible token (NFT) data record, and assign said at
least one digital asset nonfungible token (NFT) data
record to at least one NFT blockchain;
electronically verify at least one system asset proxy
account for said signature authority (SA) for said at
least one digital asset; and
electronically create at least one event transaction for
said signature authority (SA) and said at least one
system asset proxy account, and electronically assign
said at least one event transaction to an at least one
blockchain separate from the at least one NFT block-
chain.

11. The system according to claim 10, comprising
wherein the electronic computer processor is configured to
at least one or more of:
wherein said digital asset is implemented as said at least
one data asset record, and is expected to undergo events
comprising wherein said processor is configured to:
identify, and describe at least one change to said at least
one data asset record representing said digital asset
over a duration of time;
wherein said digital asset comprises, wherein said pro-
cessor is configured to:
represent at least one or more of:
a person,
an event,
data,
a process, or
a subject;
wherein said digital asset comprises:
wherein said digital asset is produced from a digital
asset type, and
wherein said digital asset type is encoded from:
a general data structure; and
a behavior pattern of a similar digital asset to said
digital asset;
wherein said digital asset type is analogous to a build-
ing blueprint, wherein the building blueprint is con-
figured to construct a data record to represent the
digital asset;
wherein said digital asset type comprises at least one
template for artifact descriptions of an artifact, and
further comprising wherein said processor is config-
ured to at least one or more of:
identify at least one notary assignment to the artifact; or
validate the at least one notary assignment of the
artifact to the Digital Asset;
wherein said digital asset comprises:
a dossier component comprising:
a collection of data and documents to add to the
representation of the digital asset,
wherein any change or any event is recorded
through a digital journal,
wherein said digital journal comprises:
a case history method comprising:
a blockchain ledger, and
a digital logging system;
wherein said digital asset is assigned an arbitrary data
type as an aggregate of digital artifacts comprising at
least one or more of:
documents,
paperwork,
identities of involved parties related to the digital asset,
other related digital assets, or
dependencies on other digital assets; or further comprising:

collecting at least one document; and combining the at least one document with at least one data element received from an Internet of Things (IoT) network, wherein both said at least one document and an at least one data element type of said at least one data element are assigned as contents of a dossier.

12. A computer program product embodied on a computer accessible nontransitory storage medium, including at least one instruction, which when executed on at least one electronic computer processor performs a method of registering digital assets for lifecycle events, notarizations, and responses, the method comprising:

electronically receiving or assembling data for at least one digital asset comprising:

parties identification data, asset type, and metadata;

electronically receiving a transaction to create a digital asset with data request;

electronically obtaining at least one asset type template;

electronically determining availability of said at least one asset type template, and if said availability of said at least one asset type template is determined available, then proceeding to at least one or more of:

electronically generating at least one digital asset record (DAR) and contents from said at least one asset type template;

electronically obtaining at least one notary recipe template for digital asset contents;

electronically determining if said at least one notary recipe template is available and only if not available creating, by the at least one electronic computer processor, a notary recipe; or electronically generating at least one notary recipe and assigning said at least one notary recipe to data or document of said at least one digital asset record (DAR); and if said availability of said at least one asset type template is determined not to be available, then proceeding to at least one or more of:

electronically creating said at least one digital asset record (DAR);

electronically creating said data or document specification and assigning, by the at least one electronic computer processor, said specification to said at least one digital asset record (DAR); or electronically obtaining, creating, or assigning said at least one notary recipe template for said data or document specification; and electronically assigning party identifiers to said at least one notary recipes for digital signatures;

electronically assigning double notary criteria to said at least one notary recipe;

electronically granting signature authority (SA) for said at least one digital asset record (DAR) to a system asset proxy account;

electronically assigning said signature authority (SA) to said at least one digital asset record (DAR);

electronically storing said at least one digital asset record (DAR) to at least one asset record data storage device;

electronically assembling at least one digital asset nonfungible token (NFT) data record, and assigning said at least one digital asset nonfungible token (NFT) data record to at least one NFT blockchain;

electronically verifying at least one system asset proxy account for said signature authority (SA) for said at least one digital asset; and electronically creating at least one event transaction for said signature authority (SA) and said at least one system asset proxy account, and electronically assigning said at least one event transaction to an at least one blockchain separate from the at least one NFT blockchain.

13. The computer program product according to claim 12, wherein the method comprises, wherein said digital asset is implemented as said at least one data asset record, and is expected to undergo events comprising:

identifying, and describing at least one change to said at least one data asset record representing said digital asset over a duration of time.

14. The computer program product according to claim 12, wherein the method comprises, wherein said digital asset comprises:

representing at least one or more of:

a person, an event, data, a process, or a subject.

15. The computer program product according to claim 12, wherein the method comprises, wherein said digital asset comprises:

wherein said digital asset is produced from a digital asset type, and wherein said digital asset type is encoded from:

a general data structure; and a behavior pattern of a similar digital asset to said digital asset.

16. The computer program product according to claim 12, wherein the method comprises, wherein said digital asset type is analogous to a building blueprint, wherein the building blueprint is processed by a method to construct a data record to represent the digital asset.

17. The computer program product according to claim 12, wherein the method comprises, wherein said digital asset type comprises at least one template for artifact descriptions of an artifact, and further comprising at least one or more of:

identifying at least one notary assignment to the artifact; or validating the at least one notary assignment of the artifact to the Digital Asset.

18. The computer program product according to claim 12, wherein the method comprises wherein said digital asset comprises:

a dossier component comprising:

a collection of data and documents to add to the representation of the digital asset, wherein any change or any event is recorded through a digital journal, wherein said digital journal comprises:

a case history method comprising:

a blockchain ledger, and a digital logging system.

19. The computer program product according to claim 12, wherein the method comprises, wherein said digital asset is assigned an arbitrary data type as an aggregate of digital artifacts comprising at least one or more of:

documents, paperwork, identities of involved parties related to the digital asset, other related digital assets, or dependencies on other digital assets.

20. The computer program product according to claim 12, wherein the method further comprises:

collecting at least one document; and combining the at least one document with at least one data element received from an Internet of Things (IoT) network, wherein both said at least one document and an at least one data element type of said at least one data element are assigned as contents of a dossier.

* * * * *